United States Patent [19]

Yokota et al.

[11] 4,257,704
[45] Mar. 24, 1981

[54] DISTANCE MEASURING FINDER

[75] Inventors: Hideo Yokota, Yokohama; Hideo Tamamura, Tokyo, both of Japan

[73] Assignee: Canon Kabushiki Kaisha, Tokyo, Japan

[21] Appl. No.: 35,810

[22] Filed: May 4, 1979

[30] Foreign Application Priority Data

May 12, 1978 [JP] Japan .................................. 53-56258

[51] Int. Cl.³ .............................................. G01C 3/04
[52] U.S. Cl. .......................................... 356/8; 356/4
[58] Field of Search .............................. 356/1, 4, 5, 8

[56] References Cited

U.S. PATENT DOCUMENTS

| 3,089,380 | 5/1963 | Baur et al. | 356/8 |
| 3,653,762 | 4/1972 | Harvey | 356/4 |
| 3,963,347 | 6/1976 | Segre et al. | 356/4 |

Primary Examiner—Bruce C. Anderson
Attorney, Agent, or Firm—Toren, McGeady and Stanger

[57] ABSTRACT

A finder provided with a distance measuring device for measuring a distance to an object being photographed by projecting infrared light from a light emitting means through a projection optical system onto the object and by receiving the reflected light from the object through a light collecting optical system at photosensitive means. Positioned in a space between the projection optical system and the light collecting optical system is an objective lens of a mark finder. Light transmitted through said objective lens is directed through a half mirror to an eyepiece; a field framing plate and a reflection mirror are provided with respective openings at the center thereof and arranged so that either one of the light paths of the above described projection optical system and light collecting optical system passes through the openings, and light entering through the frame marks of the field framing plate is directed to the eyepiece after successive reflection from the reflection mirror and the half mirror.

5 Claims, 6 Drawing Figures

DISTANCE MEASURING FINDER

BACKGROUND OF THE INVENTION

1. Field of the Invention

The present invention relates to distance measuring finders and, more particularly, to a distance measuring finder combining a distance measuring device based on the principle of the base line distance meter with a mark finder.

2. Description of the Prior Art

In general, a distance measuring device based on the principle of the base line distance meter is one that performs distance measuring operation by projecting infrared light from a light emitting device onto an object being photographed through a projection optical system and by causing the reflected light from said object to be received by a light receiving device through a light collecting optical system. This distance measuring operation of the distance measuring device is divided into two major types. One type uses a plurality of light receiving elements as the light receiving device, and the other type uses a single light receiving element.

The type using the plurality of light receiving elements selects the light receiving elements in sequence as the photographic lens is focused. Upon detection of the one light receiving element which receives most of the reflected light from the object, the output of that light receiving element functions as an in-focus signal to stop the focusing operation of the photographic lens. On the other hand, the type using the single light receiving element scans the object by making movable either the light receiving element or the light emitting device in response to the focusing operation of the photographic lens. Upon the detection of the instant at which most of the reflected light from the object is received, the concurrent output of the light receiving element functions as the in-focus signal to stop focusing operation of the photographic lens.

Such distance measuring device of whichever type can be easily improved in the accuracy of distance measurement by increasing the interval between the projection optical system and the light collecting optical system. This may be done providing that the output of the light emitting device, the sensitivity of the light receiving device, the accuracy of the signal processing circuit for the light receiving device, and the like are constant.

When the interval between the projection optical system and the light collecting optical system is made too large, however, the size of the camera increases. This results in making the camera less portable. For this reason, it is necessary to limit the interval between the projection optical system and the light collecting optical system to a predetermined one necessary for maximum portability of the camera.

For this reason, according to the prior art, by providing a finder of a construction so simple that an objective lens and an eyepiece are only arranged on a common optical axis between the projection optical system and the light collecting optical system of the distance measuring device as in the Albata finder, the creation of a necessary predetermined interval between the projection optical system and the light collecting optical system was made possible; the space between the projection optical system and the light collecting optical system being effectively utilized.

As far as the finder is concerned, however, since the finder is of such simple construction that the objective lens and eyepiece are only arranged on the common optical axis, it is difficult to display a wide variety of information in the finder field, and even to display the range of measurement of distances. In particular, since, recently, it has become of great importance to display such information in view of camera automation, such finder cannot be said to be satisfactory in practice.

For this reason, a mark finder capable of displaying information with ease may be combined with the distance measuring device. Since the mark finder requires the provision of a field framing plate in parallel with the objective lens, however, the arrangement of such mark finder between the projection optical system and the light collecting optical system of the distance measuring device calls for an unduly large increase in the size of the camera. The result is a disadvantage in that the portability of the camera is largely reduced.

An object of the present invention is to solve the above-mentioned drawbacks and to make it possible to combine a distance measuring device based on the principle of the base line distance meter with a mark finder without causing the size of the camera to be increased.

Another object of the present invention is to make it possible that the range of measurement of distances is clearly recognized in the view field.

SUMMARY OF THE INVENTION

In accordance with the invention, a distance measuring finder comprises light emitting means for producing infrared light, a light projecting optical system for projecting the infrared light from the light emitting means onto an object being photographed and light receiving means for receiving the reflected light from the object to measure a distance to the object. Also included are a light receiving optical system for directing the reflected light from the object to the light receiving means, an objective lens for a finder arranged between the light projecting optical system and the light receiving optical system and an eyepiece arranged on a common optical axis of the objective lens. A field framing plate is further included, which plate is arranged near either one of the two optical systems. The plate has frame marks and an opening through which light from the one optical system passes. A reflection mirror forms part of the invention, which mirror is inclinedly disposed behind the field framing plate. The reflection mirror reflects light passing through the frame marks and has an opening through which a light bundle passing through the one optical system is passed. Finally included is a half mirror inclinedly disposed between the objective lens and the eyepiece lens. The half mirror directs the light transmitted through the objective lens to the eyepiece lens after having passed therethrough, and directs the light transmitted through the frame marks and reflected from the reflection mirror to the eyepiece lens after having been reflected therefrom.

For a better understanding of the present invention, reference is made to the following description and accompanying drawings, while the scope of the present invention will be pointed out in the appended claims.

DESCRIPTION OF THE PREFERRED EMBODIMENTS

Figure 1:
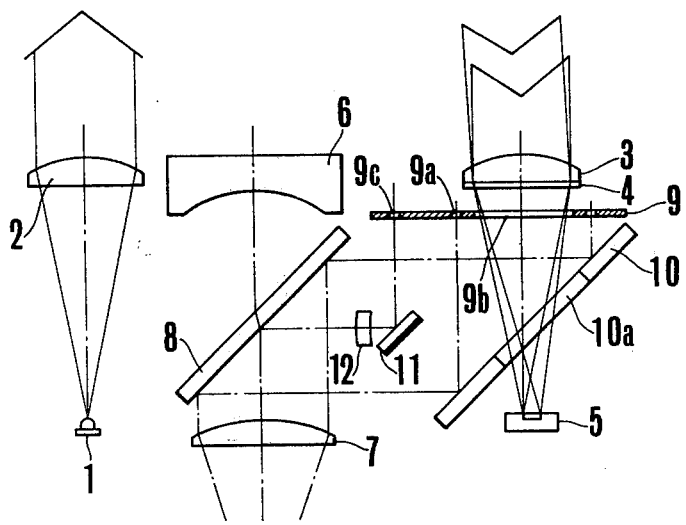
FIG. 1 is a sectional view of one embodiment of a distance measuring finder according to the present invention.
Figure 2:
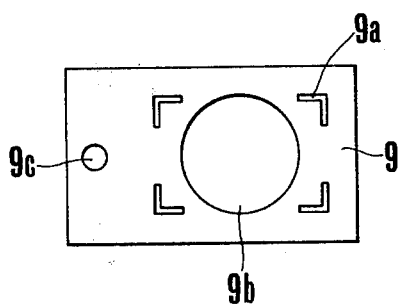
FIG. 2 is a front elevational view of the field framing plate of FIG. 1.

One embodiment of the present invention will be described next with reference to the drawings. In FIG. 1, 1 is a light emitting device such as a light emitting diode for producing infrared light; 2 is a projection lens as the projection optical system, the projection lens 2 projecting the infrared light from the light emitting device 1 onto an object being photographed; 3 is a light collecting lens functioning as the light collecting optical system arranged in parallel with the above described projection lens 2; 4 is a filter positioned behind the light collecting lens 3, the filter transmitting the infrared light but absorbing the visible light; 5 is a light receiving device positioned to receive the reflected light from the object through the light collecting lens 3 and the filter 4; 6 is an objective lens for the finder arranged between the projection lens 2 and the light collecting lens 3; 7 is an eyepiece lens arranged on a common optical axis of the objective lens 6; 8 is a half mirror positioned between the objective lens 6 and the eyepiece lens 7 so as to form an angle with the optical axis; 9 is a field framing plate arranged behind the light collecting lens 3 and the filter 4, the field framing plate 9 being provided, as shown in FIG. 2, with frame corner marks 9a, a central opening 9b, and a distance measuring spot indicating mark 9c bored in a portion near the side edge; 10 is a reflection mirror disposed so as to incline between the light receiving device 5 and the field framing plate 9, the reflection mirror 10 being provided with an opening at the center thereof.

Figure 3:
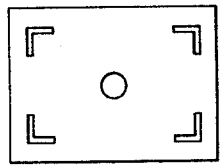
FIG. 3 shows a view field of the finder looking through the eyepiece of FIG. 1.

This opening 10a of the reflection mirror 10 is optically aligned with the opening 9b of the field framing plate 9 to permit light from the object to enter through the light collecting lens 3 and filter 4 and reaching the light receiving device 5. The reflection mirror 10 functions to direct light from the frame marks 9a of the field framing plate 9 to the half mirror; 11 is a reflection mirror for directing light from the distance measuring spot indicating mark 9c of the field framing plate 9 to the half mirror 8; 12 is a visibility correction lens arranged between the reflection mirror 11 and the half mirror 8 to cooperate with the eyepiece lens 7 so that the image of the spot mark 9c can be viewed clearly. It is noted here that the above described field framing plate 9, though positioned behind the light collecting lens 3 and filter 4, is spaced from the eyepiece lens 7 by an optical distance almost equal to the focal length thereof. Therefore, the photographer can view the images of the frame marks 9a and the spot mark 9c in the field or view of the finder as shown in FIG. 3.

In order to take photographs, the photographer will first look through the finder to locate an image of a scene to be photographed within the area defined by the images of the frame marks 9a, while placing the image of the distance measuring spot indicating mark 9c in registry with an object of principal photographic interest. Then, the light emitting device 1 is energized to produce infrared light which is projected by the projection lens 2 to the object. The reflected light from the object is directed through the light collecting lens 3, filter 4, opening 9b of the field framing plate 9 and opening 10a of the reflection mirror 10 to the light receiving device 5. When a plurality of light receiving elements are used in the light receiving device 5, as the focusing operation is being performed, the light receiving elements are successively selected one at a time to detect which of the light receiving elements receives the reflected light from the object. The detected light receiving element produces an output which serves as the in-focus signal to stop the focusing operation of the photographic lens. On the other hand, when a single light receiving element is used as the light receiving device 5, as either the light emitting device 1 or the light receiving device 5 is moved in response to a focusing operation of the photographic lens to scan the object and when the reflected light from the object is received at maximum, the output of the light receiving device 5 at that time serves as the in-focus signal to stop the focusing operation of the photographic lens. In such distance measuring operation, it is only required to understand how the light emitting device 1, the projection lens 2, the light collecting lens 3 and the light receiving device 5 are arranged as shown in the drawings. Therefore, further explanation is not presented as to the practical distance measuring operation.

On the other hand, light entering through the objective lens 6 is directed through the half mirror 8 to the eyepiece lens 7, while light passing through the frame marks 9a of the field framing plate 9 is directed through the reflection mirror 10 and half mirror 8 to the eyepiece lens 7. Light passing through the distance measuring spot indicating mark 9c is directed through the reflection mirror 11, the visibility correction lens 12 and the half mirror 8 to the eyepiece lens 7. Therefore, the photographer can recognize the individual images of the object, frame marks 9a, distance measuring spot indicating mark 9c in the field of view through the eyepiece 7 as shown in FIG. 3. The above described filter 4 prevents the visible light from entering the light receiving device 5 and from being guided to the eyepiece lens 7 after reflection from the reflection mirror 10 and the half mirror 8.

Figure 4:
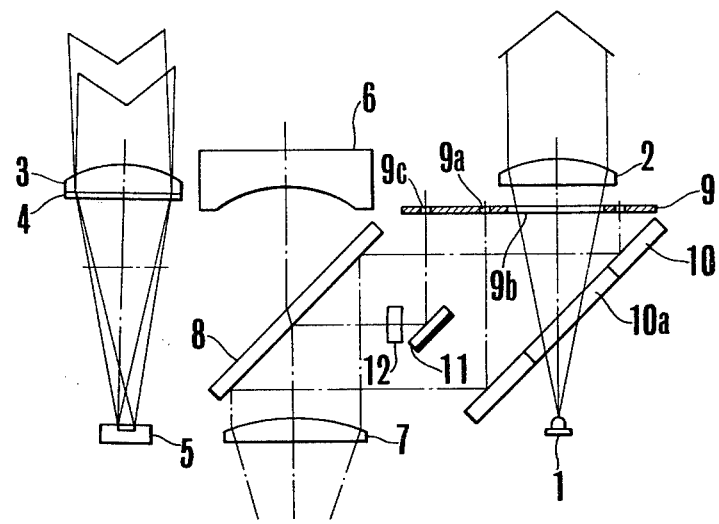
FIG. 4 is a sectional view of another embodiment of a distance measuring finder according to the present invention.

The foregoing embodiment has been described wherein the receiving light bundle is caused to be passed through the openings 9b and 10a of the field framing plate 9 and the reflection mirror 10. The present invention, however, is not so limited. As shown in FIG. 4, the field framing plate 9 and the reflection mirror 10 may be arranged so that the projection light path passes through the openings 9b and 10a thereof. It is noted that the FIG. 4 embodiment is identical with the FIG. 1 embodiment except for the arrangement of the field framing plate 9 and the reflection mirror 10 between the light emitting device 1 and the projection lens 2. Therefore, further explanation thereof is omitted.

Figure 5:
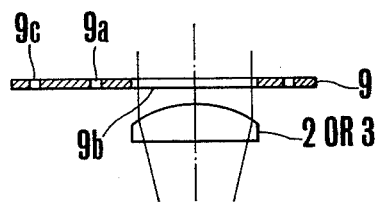
FIG. 5 is a fragmentary sectional view showing an example of modification of the finders of FIGS. 1 and 4 in which the field framing plate is positioned in front of the lens.

Though the field framing plate 9 is shown as being arranged behind the light collecting lens 3 or the projection lens 4 in FIG. 1 or FIG. 4, the present invention is not confined thereto. The field framing plate 9 may be arranged in front of the light collecting lens 3 or the projection lens 2 as shown in FIG. 5. In this case, for use as the eyepiece lens 7, it is necessary to employ a lens having a slightly longer focal length. Other aspects of the construction and arrangement are exactly the same as those in FIG. 1 or 4.

Figure 6:
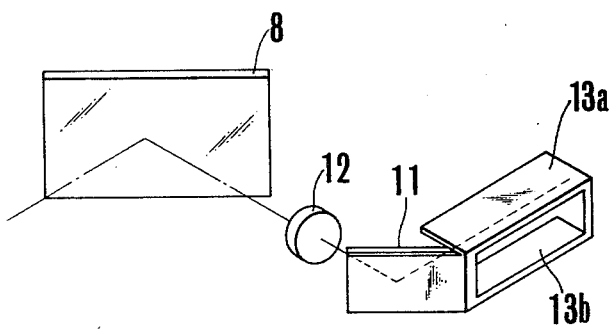
FIG. 6 is a fragmentary perspective view showing another example of modification with the provision of a light shielding plate to the reflection mirror for displaying the range of measurement of distances.

It is noted that when the reflection mirror 11 is arranged near the frame marks 9a as in the above embodiments, a portion of the light passing through the frame marks 9a will be reflected by the reflection mirror 11 with some possibility to form a ghost image. To avoid this, that portion of the frame mark 9a bored in the slit form may be removed to a suitable length. It is far more effective to provide a light shielding means between the reflection mirror 11 and the distance measuring spot indicating mark 9c while not inhibiting the optical path of the frame marks 9a. FIG. 6 shows this light shielding means. Elements 13a and 13b are two parallel light shielding plates being provided so as not to block the path of light from the frame marks 9a, and these light shielding plates 13a and 13b are formed in unison with the support member 11a of the reflection mirror 11 to prevent a portion of the light passing through the frame marks 21 from entering the reflection mirror 11.

As has been described in detail above, according to the present invention, by incorporating a portion of the frame mark optical path of the mark finder in the optical path for the distance measurement, the mark finder can be combined with the distance measuring device without causing the size of the camera to be increased, and the picture frame marks and the distance measuring portion mark can be clearly displayed in the field of view of the finder. Further, when the framing plate is provided with additional holes for displaying information, the display of such information can be easily performed through these holes.

While the foregoing description and drawings represent the preferred embodiments of the present invention, it will be obvious to those skilled in the art that various changes and modifications may be made therein without departing from the true spirit and scope of the present invention.

What is claimed is:

1. A distance measuring finder comprising:
   (a) light emitting means for producing infrared light;
   (b) a light projecting optical system for projecting the infrared light from said light emitting means onto an object being photographed;
   (c) light receiving means for receiving the reflected light from the object to measure a distance to the object;
   (d) a light receiving optical system for directing the reflected light from the object to said light receiving means;
   (e) an objective lens for a finder arranged between said light projecting optical system and said light receiving optical system;
   (f) an eyepiece lens arranged on a common optical axis of said objective lens;
   (g) a field framing plate arranged near either one of said two optical systems, said plate having frame marks, a distance measuring portion indicating mark and an opening through which light from said one optical system passes;
   (h) a reflection mirror incliningly disposed behind said field framing plate, said reflection mirror reflecting light passing through said frame marks and having an opening through which a light bundle passing through said one optical system is passed;
   (i) a half mirror incliningly disposed between said objective lens and said eyepiece lens, said half mirror directing the light transmitted through said objective lens to said eyepiece lens after having passed therethrough, and directing the light transmitted through the frame marks and reflected from said reflection mirror to said eyepiece lens after having been reflected therefrom; and
   (j) another reflection mirror for directing light transmitted through said indicating mark to said half mirror.

2. A distance measuring finder according to claim 1, further including a visibility correction lens provided between said reflected mirror and said half mirror.

3. A distance measuring finder according to claim 1, further including a light shielding member for preventing a portion of the light transmitted through said frame marks from entering said reflection mirror, said member being provided so as not to inhibit the frame mark optical path.

4. A distance measuring finder comprising:
   (a) light emitting means for producing infrared light;
   (b) a light projecting optical system for projecting the infrared light from said light emitting means onto an object being photographed;
   (c) light receiving means for receiving the reflected light from said object to measure a distance to said object;
   (d) a light receiving optical system for directing the reflected light from the object to said light receiving means, said light receiving optical system being provided in parallel with said light projecting optical system;
   (e) an objective lens for the finder arranged between said light projecting optical system and said light receiving optical system;
   (f) an eyepiece lens arranged on a common optical axis of said objective lens;
   (g) a field framing member arranged in the neighborhood of said light receiving optical system, said member having frame marks, a distance measuring portion indicating mark and an opening through which a light bundle passing through said light receiving optical system is passed;
   (h) a reflection mirror incliningly disposed between said field framing member and said light receiving means, said reflection mirror reflecting the light transmitted through said frame marks, and having an opening through which a light bundle passing through said light receiving optical system is passed, and said opening and the opening of said field framing member being provided so as not to inhibit the optical path between said light receiving optical system and said light receiving means;
   (i) a half mirror incliningly disposed between said objective lens and said eyepiece lens, said half mirror directing the light transmitted through said objective lens to said eyepiece lens after having passed therethrough, and directing the light transmitted through the frame marks and reflected from said reflection mirror to said eyepiece lens after having been reflected therefrom; and
   (j) another reflection mirror for directing light transmitted through said indicating mark to said half mirror.

5. A distance measuring finder comprising:

(a) light emitting means for producing infrared light;
(b) a light projecting optical system for projecting the infrared light from said light emitting means onto an object being photographed;
(c) light receiving means for receiving the reflected light from said object to measure a distance to said object;
(d) a light receiving optical system for directing the reflected light from said object to said light receiving means, said light receiving optical system being provided in parallel with said light projecting optical system;
(e) am objective lens for the finder arranged between said light projecting optical system and said light receiving optical system;
(f) an eyepiece lens being arranged on a common optical axis of said objective lens;
(g) a field framing member arranged near said light projecting optical system, said field framing member having frame marks, a distance measuring portion indicating mark and an opening through which a light bundle passing through said light projecting optical system is passed;
(h) a reflection mirror incliningly disposed between said field framing member and said light emitting means, said reflection mirror reflecting the light transmitted through said frame marks and having an opening through which a light bundle passing through said light projecting optical system is passed, said opening and the opening of said field framing member being provided so as not to inhibit the optical path between said light projecting optical system and said light emitting means;
(i) a half mirror incliningly disposed between said objective lens and said eyepiece lens, said half mirror directing the light transmitted through said objective lens to said eyepiece lens after having passed therethrough, and directing the light transmitted through the frame marks and reflected from said reflection mirror to said eyepiece lens after having been reflected therefrom; and
(j) another reflection mirror for directing light transmitted through said indicating mark to said half mirror.

* * * * *